United States Patent

Hahn

[15] 3,651,459

[45] Mar. 21, 1972

[54] CHARACTER DISTANCE CODING

[72] Inventor: Peter M. Hahn, Wyndmoor, Pa.

[73] Assignee: Philco-Ford Corporation, Philadelphia, Pa.

[22] Filed: May 15, 1970

[21] Appl. No.: 37,580

[52] U.S. Cl. ................340/146.3WD, 340/146.1, 340/172.5

[51] Int. Cl. ..........................................................G06k 9/08

[58] Field of Search ........................340/146.1, 146.3, 172.5; 179/1 SA, 1 SB

[56] References Cited

UNITED STATES PATENTS

| | | | |
|---|---|---|---|
| 3,234,392 | 2/1966 | Dickinson | 340/146.3 X |
| 3,533,069 | 10/1970 | Garry | 340/146.3 |
| 3,273,130 | 9/1966 | Baskin et al. | 340/146.3 X |
| 2,926,215 | 2/1960 | Slepian | 340/146.1 |
| 3,188,609 | 6/1965 | Harmon et al. | 340/146.3 X |
| 3,259,883 | 7/1966 | Rabinow et al. | 340/146.3 |
| 3,492,653 | 1/1970 | Fosdick et al. | 340/172.5 |

OTHER PUBLICATIONS

Stockdale, IBM Tech. Disclosure Bulletin, " Image Matching Character Recognition System," Vol. 8 No. 5, Oct. 1965. pp. 761-763.

*Primary Examiner*—Maynard R. Wilbur
*Assistant Examiner*—Leo H. Boudreau
*Attorney*—Herbert Epstein

[57] ABSTRACT

A data processing system for improving the performance of information handling systems, such as an automatic letter sorting system, wherein the class of permissible received messages is known in advance.

Received words are compared to stored words, character by character. Each comparison is given a score which is a function of the probability of confusing the particular received character with the particular character in storage to which the received character then is being compared. The scores for each character are added and a match is accepted for the stored word whose comparison with the received word yields a score indicating the highest probability of confusion.

In one embodiment, each received character is given a binary representation according to a code in which the Hamming distance between characters is indicative of their probability of interchange. Each stored character also is given a binary representation according to the same code. The binary representations of the characters of the received words are then compared to corresponding representations of the characters of stored words in an "exclusive or" gate which measures the Hamming distance between corresponding characters by making a bit by bit comparison. The Hamming distances are then added in a digital "adder" to obtain a score for the complete word. The score for the word is then compared in a "difference" circuit to the number of characters in the stored word. A match is accepted for that stored word yielding a score less than the number of characters in the word.

12 Claims, 4 Drawing Figures

INVENTOR.
PETER M. HAHN

INVENTOR
PETER M. HAHN

CHARACTER DISTANCE CODING

BACKGROUND OF THE INVENTION

The invention relates to a data processing system for improving the performance of those character recognition systems, e.g. automatic letter sorting systems, in which the class of permissible received messages is known in advance. The members of such a class may be, for example, zip code numbers or the names of a designated group of cities.

In an automatic letter sorting system, a comparison is made between the alpha-numerics read by an optical character reader (OCR) and the various entries stored in an electronic address directory (EAD). Depending upon whether or not a unique match is found between the OCR read characters and an EAD entry, the letter is sorted or fails to be sorted. In present systems, a unique match is possible only if no contradiction exists between the individual characters as read by the OCR and their counterparts in the EAD entry.

Since it is difficult for the OCR to differentiate among certain character pairs, it is quite common that one of the alphanumerics read in an address will be in error. As a result, no EAD entry will match the OCR output. Thus, the system's ability to sort is seriously hindered.

It is possible to increase the probability of a match by enlarging the EAD to include several versions of each EAD entry. For instance, since it is difficult for the OCR to differentiate between D and O, entries for Detroit in the EAD might include: DETROIT, OETROIT, DETRDIT, OETRDIT. This would increase the probability of a correct match, i.e., "improve the sort", but not greatly. Permitting contradiction in a larger number of characters would greatly increase storage requirements and look-up time and would quickly lead to a loss in ability to discriminate and, consequently, an increase in the percentage of multiple, or incorrect, sorts.

Accordingly an object of this invention is to provide an improved data processing system for those character recognition systems in which the class of permissible received messages is known in advance.

Another object is to provide an improved automatic letter sorting system.

Another object is to permit such a system to match the OCR output to the correct EAD entry despite OCR errors.

Another object is to provide a more accurate automatic letter sorting system without substantially increasing look-up time.

Another object is to provide an improved method for recognizing which of a predetermined class of messages has been received.

DRAWING

DESCRIPTION OF THE INVENTION

Before entering upon a detailed description of the method and apparatus of the invention and the operation of that apparatus, the concept upon which the invention is based is described briefly.

According to the invention, matches between received words and stored words are accepted not only on the basis of the number of characters in contradiction, as was done in the prior art, but also on the basis of the likelihood of specific characters being in contradiction.

Figure 1:
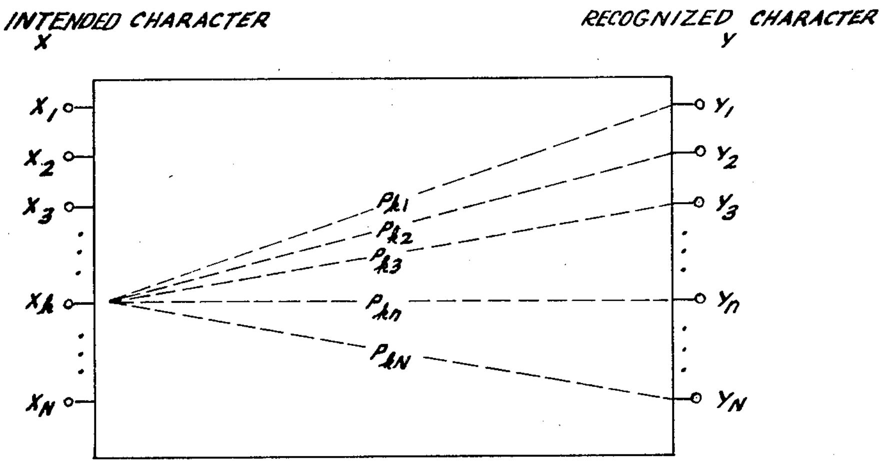
FIG. 1 represents the array of conditional probabilities $P_{kn}$ of recognizing character $Y_n$, when character $X_k$ is intended.

Assume that the characters which are intended and are to be recognized, are represented by $X_1, X_2, X_3 \ldots X_N$. Assume further that the characters "recognized" by the processing system in response to one of the intended characters, $X_k$, is one of a predetermined group $Y_1, \ldots Y_N$. For example, both $X_1$ to $X_N$, and $Y_1$ to $Y_N$, may be the same predetermined group of alpha-numerics. The possible observations, $Y_n$, are related to the intended characters, $X_k$, by the N × N matrix of conditional probabilities, $P_{kn}$, shown in FIG. 1. That is, given the "-condition" that the character $X_k$ is intended, there is a probability $P_{kn}$ that the data processing system will recognize that character as $Y_n$. By assigning a score, related to $P_{kn}$, to each comparison made between a character read by the data processing system and the stored entries in the EAD, a best match between a received word made up of a plurality of such characters, and one of a plurality of words stored in the EAD and also made up of such characters, can be found even though contradictions exist between individual characters of the recognized and stored words whose characters are being compared. A low score can be assigned if $P_{kn}$ is high and vice versa. Hence, a low score is given only when it is likely that a character $X_k$ has been misread as $Y_n$; otherwise the score is high. Characters which agree exactly receive a score of zero. A match can be accepted on the basis of a low average score per character. For example, as has been noted previously, the letters D and O are often confused. Therefore, for $X_k = D$ and $Y_n = O$, $P_{kn}$ will be large and the score will be low. Thus, comparison to the EAD entry DETROIT of a recognized word indicated by the data processing system to be OETRDIT will yield a low score, and the system will recognize is as a match even though there are contradictions between the word read by the data processing system and the correct entry in the EAD.

Figure 2:
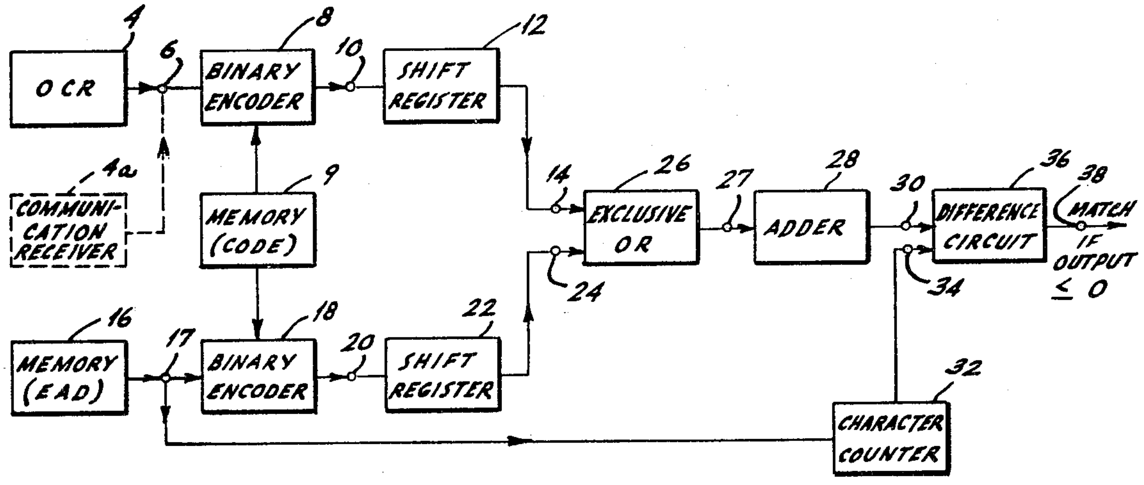
FIG. 2 is a block diagram of one embodiment of the invention.

A processing system according to the invention is shown in FIG. 2. In that system letters are scanned by OCR system 4 which generates at output terminal 6 electronic signals representative of the received words. A suitable OCR for use in the system of the present invention is described in U.S. Pat. No. 3,426,325, issued to M. E. Partin et al., on Feb. 4, 1969, and entitled "Character Recognition Apparatus". Terminal 6 is connected to binary encoder 8, which is connected to shift register 12 for temporary storage of each received word. The EAD is stored in memory unit 16. Access terminal 17 of memory unit 16 is connected to binary encoder 18 which is connected to shift register 22. Memory unit 9, in which the system code is stored, is connected to both binary encoder 8 and binary encoder 18. Shift register 12 is connected to input terminal 14 of "exclusive or" gate 26, and shift register 22 is connected to input terminal 24 of "exclusive or" gate 26. Output terminal 27 of "exclusive or" gate 26 is connected to adder 28 which is connected to input terminal 30 of difference circuit 36. Access terminal 17 of memory unit 16 is also connected to character counter 32, the output of which is connected to input terminal 34 of difference circuit 36. The result of each match between received words and stored words is available at output terminal 38.

Figure 3:
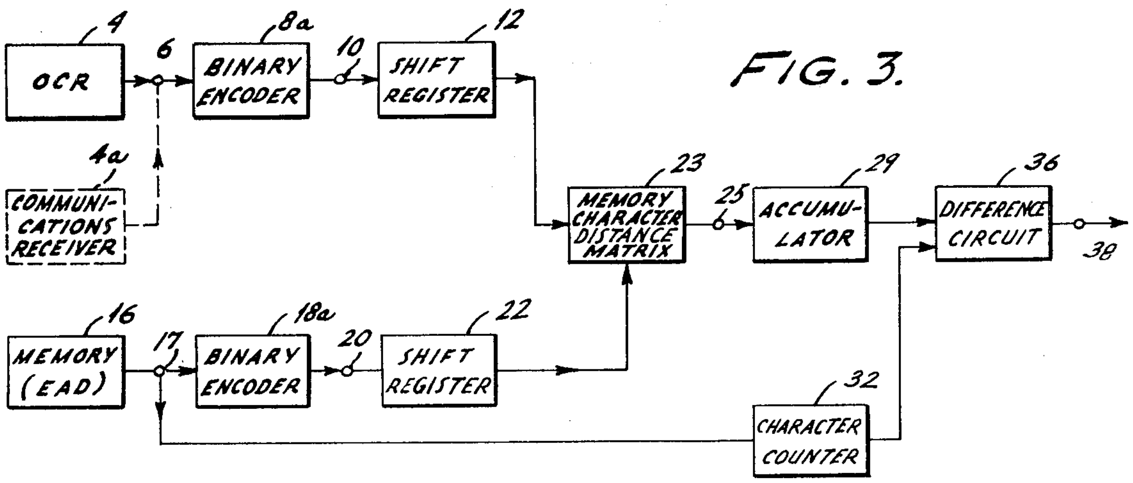
FIG. 3 is a block diagram of another embodiment of the invention.

An alternative embodiment of the invention is shown in FIG. 3. This embodiment is similar to that of FIG. 2 except that memory unit 9 is omitted and the tandem combination of "exclusive or" gate 26 and adder 28 is replaced by the tandem combination of memory unit 23 and accumulator 29. Components shown in FIG. 3 which correspond to components shown in FIG. 2 are designated by the same numerals.

Because all of the above-identified structures in FIGS. 2 and 3 may be of conventional structure, they are not described further herein.

SYSTEM OPERATION

In the system of FIG. 2, the address alpha-numerics (i.e. the characters) on each letter to be sorted (not shown) are scanned by OCR system 4, which operates to produce at output terminal 6, signals representative of each character scanned. Each signal is converted to binary form by binary encoder unit 8 to produce, at terminal 10, input binary sequences representative of each scanned character. Each scanned character is represented by a unique binary sequence according to a code stored in memory unit 9. This code, discussed more fully hereinafter, is chosen so that the Hamming distance between characters is indicative of the probability of their interchange, i.e. confusion, by the OCR. (The Hamming distance is the number of places in which two binary code words of fixed length differ. For example: 110111 and 100011 differ in two places – the second and fourth places. Thus the Hamming distance is 2.) The probabilities of interchange or character confusabilities depend on the respective shapes of the various characters in the predetermined group of characters. A character confusability matrix showing probabilities of interchange for an upper case sans serif chain printer is set forth in the following tabulation headed "TABLE I." In Table I the symbol - represents any character not recognized by the OCR, the symbol % represents confusion between D and O, and the symbol ( represents confusion between C and O. This tabulation is a particular example of the array of conditional probabilities shown in FIG. 1. Different matrices of similar form apply to different fonts of characters.

The criteria for selecting a code for Character Distance Coding are the following: N different code words must be provided, where N is a number at least as great as the

TABLE I.—CHARACTER CONFUSABILITY MATRIX

[Intended Characters]

| Recognized characters: | 0 | 1 | 2 | 3 | 4 | 5 | 6 | 7 | 8 | 9 | A | B | C | D | E | F | G | H |
|---|---|---|---|---|---|---|---|---|---|---|---|---|---|---|---|---|---|---|
| 0 | .2242 | .0002 | .0002 | .0002 | .0002 | .0002 | .0002 | .0002 | .0002 | .0002 | .0002 | .0002 | .0002 | .0002 | .0002 | .0002 | .0002 | .0002 |
| 1 | .0050 | .9228 | .0002 | .0002 | .0002 | .0002 | .0002 | .0050 | .0002 | .0002 | .0002 | .0002 | .0002 | .0002 | .0002 | .0002 | .0002 | .0002 |
| 2 | .0002 | .0002 | .9180 | .0002 | .0002 | .0002 | .0002 | .0002 | .0002 | .0002 | .0002 | .0002 | .0002 | .0002 | .0002 | .0002 | .0002 | .0002 |
| 3 | .0002 | .0002 | .0002 | .9626 | .0002 | .0002 | .0002 | .0002 | .0050 | .0002 | .0002 | .0002 | .0002 | .0002 | .0002 | .0002 | .0002 | .0002 |
| 4 | .0002 | .0002 | .0002 | .0002 | .9726 | .0002 | .0002 | .0002 | .0002 | .0100 | .0002 | .0002 | .0002 | .0002 | .0002 | .0002 | .0002 | .0002 |
| 5 | .0002 | .0002 | .0002 | .0002 | .0002 | .9180 | .0050 | .0002 | .0002 | .0150 | .0002 | .0002 | .0002 | .0002 | .0002 | .0002 | .0002 | .0002 |
| 6 | .0002 | .0002 | .0002 | .0002 | .0002 | .0002 | .9628 | .0002 | .0002 | .0002 | .0002 | .0002 | .0002 | .0002 | .0002 | .0002 | .0002 | .0002 |
| 7 | .0002 | .0002 | .0002 | .0050 | .0002 | .0002 | .0002 | .9628 | .0002 | .0002 | .0002 | .0002 | .0002 | .0002 | .0002 | .0002 | .0002 | .0002 |
| 8 | .0002 | .0002 | .0002 | .0002 | .0002 | .0002 | .0002 | .0002 | .9432 | .0002 | .0002 | .0002 | .0500 | .0002 | .0002 | .0002 | .0002 | .0002 |
| 9 | .0002 | .0002 | .0002 | .0002 | .0002 | .0050 | .0002 | .0002 | .0050 | .9330 | .0002 | .0002 | .0002 | .0002 | .0002 | .0002 | .0002 | .0002 |
| A | .0002 | .0002 | .0002 | .0002 | .0002 | .0002 | .0002 | .0002 | .0002 | .0002 | .9626 | .0002 | .0002 | .0002 | .0002 | .0002 | .0002 | .0002 |
| B | .0002 | .0002 | .0002 | .0002 | .0002 | .0002 | .0002 | .0002 | .0200 | .0002 | .0002 | .8992 | .0002 | .0002 | .0002 | .0002 | .0002 | .0002 |
| C | .0300 | .0002 | .0002 | .0002 | .0002 | .0002 | .0002 | .0002 | .0002 | .0002 | .0002 | .0002 | .9476 | .0100 | .0100 | .0002 | .0500 | .0002 |
| D | .0002 | .0002 | .0002 | .0002 | .0002 | .0002 | .0002 | .0002 | .0002 | .0002 | .0002 | .0002 | .0002 | .3276 | .0002 | .0002 | .0002 | .0002 |
| E | .0002 | .0002 | .0002 | .0002 | .0002 | .0002 | .0002 | .0002 | .0002 | .0002 | .0002 | .0100 | .0002 | .0002 | .9332 | .0002 | .0002 | .0002 |
| F | .0002 | .0002 | .0002 | .0002 | .0002 | .0002 | .0002 | .0002 | .0002 | .0002 | .0002 | .0050 | .0002 | .0002 | .0150 | .9528 | .0002 | .0002 |
| G | .0002 | .0002 | .0002 | .0002 | .0002 | .0002 | .0002 | .0002 | .0002 | .0002 | .0002 | .0002 | .0050 | .0002 | .0002 | .0002 | .9428 | .0002 |
| H | .0002 | .0002 | .0002 | .0002 | .0002 | .0002 | .0002 | .0002 | .0002 | .0002 | .0002 | .0020 | .0002 | .0002 | .0002 | .0002 | .0002 | .9514 |
| I | .0002 | .0500 | .0002 | .0002 | .0002 | .0002 | .0002 | .0002 | .0002 | .0002 | .0002 | .0002 | .0002 | .0002 | .0002 | .0002 | .0002 | .0010 |
| J | .0500 | .0002 | .0002 | .0002 | .0002 | .0002 | .0002 | .0002 | .0002 | .0002 | .0002 | .0002 | .0002 | .0002 | .0002 | .0002 | .0002 | .0002 |
| K | .0002 | .0002 | .0002 | .0002 | .0002 | .0002 | .0002 | .0002 | .0002 | .0002 | .0002 | .0002 | .0002 | .0002 | .0002 | .0002 | .0002 | .0010 |
| L | .0050 | .0002 | .0002 | .0002 | .0002 | .0002 | .0002 | .0002 | .0002 | .0002 | .0002 | .0002 | .0050 | .0002 | .0050 | .0002 | .0002 | .0002 |
| M | .0002 | .0002 | .0002 | .0002 | .0002 | .0002 | .0002 | .0002 | .0002 | .0002 | .0002 | .0002 | .0002 | .0002 | .0002 | .0002 | .0002 | .0050 |
| N | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| O | .0500 | .0002 | .0002 | .0002 | .0002 | .0002 | .0002 | .0002 | .0002 | .0002 | .0002 | .0020 | .0050 | .0200 | .0002 | .0002 | .0002 | .0002 |
| P | .0002 | .0002 | .0002 | .0002 | .0002 | .0002 | .0002 | .0002 | .0002 | .0002 | .0002 | .0020 | .0002 | .0002 | .0002 | .0200 | .0002 | .0002 |
| Q | .0002 | .0002 | .0002 | .0002 | .0002 | .0002 | .0002 | .0002 | .0002 | .0002 | .0002 | .0002 | .0010 | .0050 | .0002 | .0002 | .0002 | .0002 |
| R | .0002 | .0002 | .0002 | .0002 | .0002 | .0002 | .0002 | .0002 | .0002 | .0002 | .0002 | .0020 | .0002 | .0002 | .0002 | .0002 | .0002 | .0002 |
| S | .0002 | .0002 | .0002 | .0002 | .0002 | .0500 | .0002 | .0002 | .0002 | .0002 | .0002 | .0002 | .0002 | .0002 | .0002 | .0002 | .0002 | .0002 |
| T | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| U | .0050 | .0002 | .0002 | .0002 | .0002 | .0002 | .0002 | .0002 | .0002 | .0002 | .0002 | .0020 | .0002 | .0010 | .0002 | .0002 | .0002 | .0002 |
| V | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| W | .0002 | .0002 | .0002 | .0002 | .0002 | .0002 | .0002 | .0002 | .0002 | .0002 | .0002 | .0002 | .0002 | .0002 | .0002 | .0002 | .0002 | .0020 |
| X | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| Y | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| Z | .0002 | .0002 | .0500 | .0002 | .0002 | .0002 | .0002 | .0002 | .0002 | .0002 | .0002 | .0002 | .0002 | .0002 | .0002 | .0002 | .0002 | .0002 |
| — | .0200 | .0200 | .0200 | .0300 | .0200 | .0200 | .0250 | .0250 | .0200 | .0350 | .0300 | .0200 | .0250 | .0300 | .0300 | .0200 | .0300 | .0300 |
| % | .6000 | .0002 | .0002 | .0002 | .0002 | .0002 | .0002 | .0002 | .0002 | .0002 | .0002 | .0002 | .0002 | .6000 | .0002 | .0002 | .0002 | .0002 |
| ( | .0500 | .0002 | .0002 | .0002 | .0002 | .0002 | .0002 | .0002 | .0002 | .0002 | .0002 | .0002 | .0050 | .0002 | .0002 | .0002 | .0002 | .0002 |

| Recognized characters: | I | J | K | L | M | N | O | P | Q | R | S | T | U | V | W | X | Y | Z |
|---|---|---|---|---|---|---|---|---|---|---|---|---|---|---|---|---|---|---|
| 0 | .0002 | .0002 | .0002 | .0002 | .0002 | .0002 | .0500 | .0002 | .0002 | .0002 | .0002 | .0002 | .0002 | .0002 | .0002 | .0002 | .0002 | .0002 |
| 1 | .0200 | .0002 | .0002 | .0002 | .0002 | .0002 | .0002 | .0002 | .0002 | .0002 | .0002 | .0002 | .0002 | .0002 | .0002 | .0002 | .0002 | .0002 |
| 2 | .0002 | .0002 | .0002 | .0002 | .0002 | .0002 | .0002 | .0002 | .0002 | .0002 | .0002 | .0002 | .0002 | .0002 | .0002 | .0002 | .0002 | .0500 |
| 3 | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| 4 | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| 5 | .0002 | .0002 | .0002 | .0002 | .0002 | .0002 | .0002 | .0002 | .0002 | .0002 | .0500 | .0002 | .0002 | .0002 | .0002 | .0002 | .0002 | .0220 |
| 6 | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| 7 | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| 8 | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| 9 | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| A | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| B | .0002 | .0002 | .0002 | .0002 | .0002 | .0002 | .0002 | .0002 | .0002 | .0010 | .0002 | .0002 | .0002 | .0002 | .0002 | .0002 | .0002 | .0002 |
| C | .0002 | .0002 | .0002 | .0002 | .0002 | .0002 | .0300 | .0002 | .0400 | .0002 | .0002 | .0002 | .0002 | .0002 | .0002 | .0002 | .0002 | .0002 |
| D | .0002 | .0002 | .0002 | .0002 | .0002 | .0002 | .0050 | .0002 | .0010 | .0002 | .0002 | .0002 | .0002 | .0002 | .0002 | .0002 | .0002 | .0002 |
| E | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| F | .0002 | .0002 | .0002 | .0002 | .0002 | .0002 | .0002 | .0300 | .0002 | .0050 | .0002 | .0002 | .0002 | .0002 | .0002 | .0002 | .0002 | .0002 |
| G | .0002 | .0002 | .0002 | .0002 | .0002 | .0002 | .0002 | .0002 | .0002 | .0002 | .0002 | .0002 | .0002 | .0002 | .0002 | .0002 | .0002 | .0002 |
| H | .0002 | .0002 | .0050 | .0002 | .0200 | .0100 | .0002 | .0002 | .0002 | .0050 | .0002 | .0002 | .0002 | .0002 | .0200 | .0002 | .0002 | .0002 |
| I | .9332 | .0002 | .0002 | .0010 | .0002 | .0002 | .0002 | .0002 | .0002 | .0002 | .0002 | .0100 | .0002 | .0002 | .0002 | .0002 | .0002 | .0002 |
| J | .0002 | .9626 | .0002 | .0002 | .0002 | .0002 | .0050 | .0002 | .0050 | .0002 | .0002 | .0002 | .0010 | .0002 | .0002 | .0002 | .0002 | .0002 |
| K | .0002 | .0002 | .9570 | .0002 | .0100 | .0002 | .0002 | .0002 | .0002 | .0050 | .0002 | .0002 | .0002 | .0002 | .0100 | .0002 | .0002 | .0002 |
| L | .0050 | .0002 | .0002 | .9610 | .0002 | .0002 | .0100 | .0002 | .0050 | .0002 | .0002 | .0002 | .0200 | .0002 | .0002 | .0002 | .0002 | .0002 |
| M | .0002 | .0002 | .0002 | .0002 | .9214 | .0100 | .0002 | .0002 | .0002 | .0002 | .0002 | .0002 | .0002 | .0002 | .0050 | .0002 | .0002 | .0002 |
| N | .0002 | .0002 | .0002 | .0002 | .0010 | .9530 | .0002 | .0002 | .0002 | .0002 | .0002 | .0002 | .0002 | .0002 | .0050 | .0002 | .0002 | .0002 |
| O | .0002 | .0002 | .0002 | .0002 | .0002 | .0002 | .5434 | .0002 | .0400 | .0002 | .0002 | .0002 | .0032 | .0002 | .0002 | .0002 | .0002 | .0002 |
| P | .0002 | .0002 | .0002 | .0002 | .0002 | .0002 | .0002 | .9328 | .0002 | .0050 | .0002 | .0002 | .0002 | .0002 | .0002 | .0002 | .0002 | .0002 |
| Q | .0002 | .0002 | .0002 | .0002 | .0002 | .0002 | .0010 | .0002 | .7590 | .0002 | .0002 | .0002 | .0002 | .0002 | .0002 | .0002 | .0002 | .0002 |
| R | .0002 | .0002 | .0002 | .0002 | .0002 | .0002 | .0002 | .0002 | .0002 | .9426 | .0002 | .0002 | .0002 | .0002 | .0002 | .0002 | .0002 | .0002 |
| S | .0002 | .0002 | .0002 | .0002 | .0002 | .0002 | .0002 | .0002 | .0002 | .0002 | .9128 | .0002 | .0002 | .0002 | .0002 | .0002 | .0002 | .0002 |
| T | .0100 | .0002 | .0002 | .0002 | .0002 | .0002 | .0002 | .0002 | .0002 | .0002 | .0002 | .9480 | .0002 | .0002 | .0002 | .0002 | .0050 | .0002 |
| U | .0002 | .0002 | .0002 | .0010 | .0002 | .0002 | .0100 | .0002 | .0050 | .0002 | .0002 | .0002 | .9420 | .0002 | .0002 | .0002 | .0002 | .0002 |
| V | .0002 | .0002 | .0002 | .0002 | .0002 | .0002 | .0002 | .0002 | .0002 | .0002 | .0002 | .0002 | .0002 | .9818 | .0002 | .0002 | .0002 | .0002 |
| W | .0002 | .0002 | .0002 | .0002 | .0010 | .0002 | .0002 | .0002 | .0002 | .0002 | .0002 | .0002 | .0002 | .0002 | .9234 | .0002 | .0002 | .0002 |
| X | .0002 | .0002 | .0010 | .0002 | .0002 | .0002 | .0002 | .0002 | .0002 | .0002 | .0002 | .0002 | .0002 | .0002 | .0002 | .9726 | .0002 | .0002 |
| Y | .0002 | .0002 | .0002 | .0002 | .0002 | .0002 | .0002 | .0002 | .0002 | .0002 | .0002 | .0050 | .0002 | .0010 | .0002 | .0002 | .9678 | .0002 |
| Z | .0002 | .0002 | .0002 | .0002 | .0002 | .0002 | .0002 | .0002 | .0002 | .0002 | .0002 | .0002 | .0002 | .0002 | .0002 | .0002 | .0002 | .9228 |
| — | .0250 | .0300 | .0300 | .0300 | .0400 | .0200 | .0300 | .0300 | .0300 | .0300 | .0300 | .0300 | .0300 | .0100 | .0300 | .0200 | .0200 | .0200 |
| % | .0002 | .0002 | .0002 | .0002 | .0002 | .0002 | .1000 | .0002 | .0002 | .0002 | .0002 | .0002 | .0002 | .0002 | .0002 | .0002 | .0002 | .0002 |
| ( | .0002 | .0002 | .0002 | .0002 | .0002 | .0002 | .2100 | .0002 | .1090 | .0002 | .0002 | .0002 | .0002 | .0002 | .0002 | .0002 | .0002 | .0002 |

number of different characters to be recognized. One code word must be assigned each character. The code words must be selected and assigned to the respective characters in such manner that the Hamming distances are small between code words that represent characters that are commonly interchanged by the OCR, and large between characters that are seldom interchanged by the OCR.

In a binary code employing fixed-length words of length k, i.e. a code in which each binary word has $k$ bits, there can exist a maximum of $2^k$ unique binary code words. Therefore to provide a code containing at least N unique binary code words, the word length $k$ must be an integer at least as great as $\log_2 N$. For example, for the 39 character alphabet shown in Table I, i.e. one in which N is 39, $k$ must be at least 6.

A code which fulfills all of the foregoing requirements as to number of words, word length and appropriate Hamming distances is shown in Table II. The code words for D and O, a pair of letters likely to be interchanged, are separated by a Hamming distance of only one, while the code words for D and K, a pair of letters not likely to be interchanged, are separated by a Hamming distance of five. It is possible to generate optimal codes by computer implemented algorithms. However, optimal solutions are not required for Character Distance Coding since large improvements in sorting are effected by use of even the empirically arrived-at code shown in Table II.

The coded binary input sequence representative of each received word is stored in shift register 12 for comparison to the entries in the EAD stored in memory unit 16. Signals

TABLE II.—EMPIRICALLY GENERATED CODE

| CHARACTER: | CODE |
|---|---|
| A | 010001 |
| B | 110101 |
| C | 100001 |
| D | 101000 |
| E | 110001 |
| F | 111001 |
| G | 100101 |
| H | 000010 |
| I | 011010 |
| J | 111000 |
| K | 000111 |
| L | 010010 |
| M | 101010 |
| N | 001010 |
| O | 100000 |
| P | 001001 |
| Q | 100010 |
| R | 001111 |
| S | 011001 |
| T | 111010 |
| U | 001100 |
| V | 001101 |
| W | 100110 |
| X | 100111 |
| Y | 011101 |
| Z | 010110 |
| 1 | 011110 |
| 2 | 010111 |
| 3 | 000101 |
| 4 | 011011 |
| 5 | 011000 |
| 6 | 100100 |
| 7 | 011100 |
| 8 | 010101 |
| 9 | 001011 |
| 0 | 000000 |
| (space) | 111111 |

representative of stored characters are withdrawn from memory 16 and provided at access terminal 17. Those signals are encoded by binary encoder unit 18 by employing the code stored in memory 9 to produce binary sequences representative of those signals. Since the code supplied by memory 9 to binary encoder 18 is the same as that supplied to binary encoder 8, the output of encoder 18 bears the same relationship to characters supplied by memory 16 as the output of encoder 8 bears to the characters sensed by OCR 4. The coded binary stored sequence for each stored word is transmitted from encoder 18 into shift register 22.

Shift registers 12 and 22 are synchronized to simultaneously feed, bit by bit, the corresponding code words to "exclusive or" gate 26. The output of the "exclusive or" gate is a "zero" whenever corresponding bits from the two code words are the same and "one" whenever they differ. This stream of output bits is then fed to adder circuit 28 which totals the "ones." When the binary sequence representative of all of the characters in a given EAD entry, stored in memory unit 16, has been compared with the binary sequence representative of all the characters in the word sensed by OCR 4, the output of adder 28 is dumped into difference circuit 36 at input terminal 30. Also fed into the difference circuit, at input terminal 34, is the total number of characters in the EAD entry as determined by character counter 32. The output signal appearing at terminal 38 of difference circuit 36 is the difference between the number of "ones" totalled by adder 28 and the number of characters in the EAD entry. A match between the word sensed by OCR 4 and a word supplied by EAD memory 16 is accepted if and only if the number of "ones" does not exceed the number of characters.

It will be obvious to those skilled in the art that other criteria for an acceptable match can be used. For example, instead of counting characters, any fixed number can be inserted at input terminal 34 of difference circuit 36 and a match will be obtained when the total of "ones" supplied by adder 28 is less than the number inserted. In addition the search through the EAD can be continued even after a match is found, to find that match yielding the lowest score.

Figure 4:
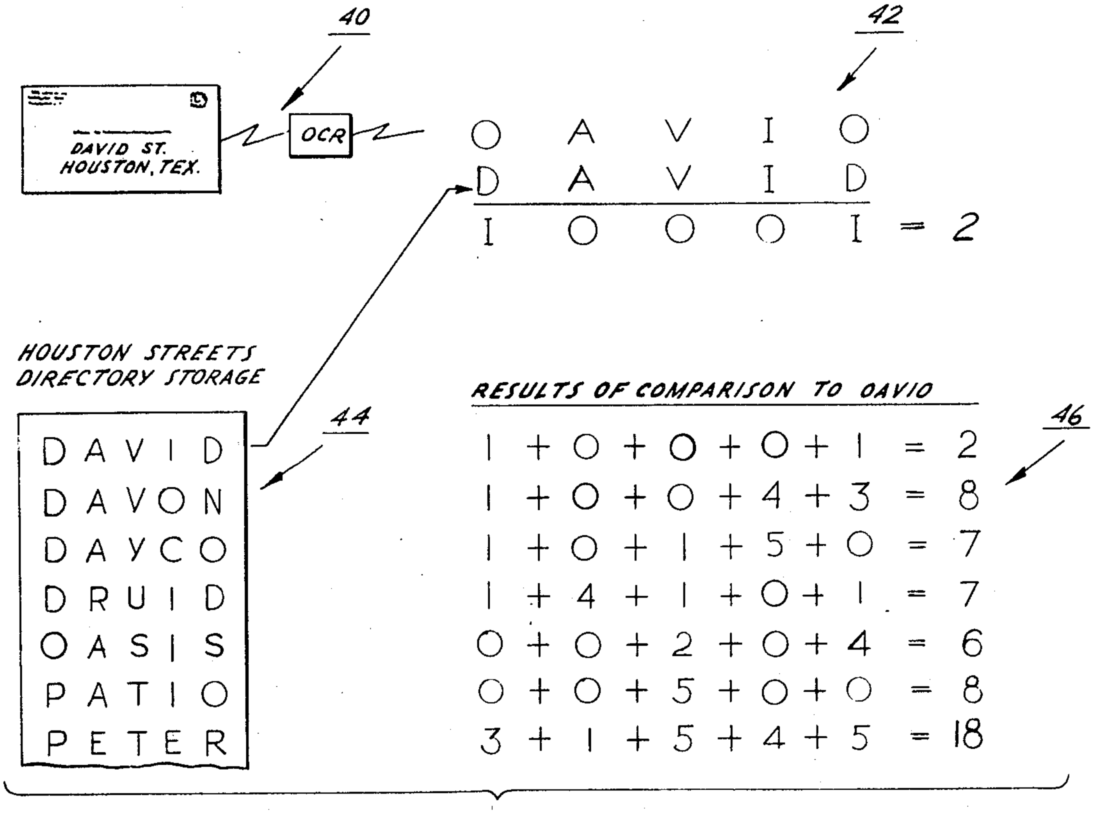
FIG. 4 illustrates the process of obtaining a best match between an address read by the OCR and an address stored in the EAD.

An example of the search process is shown in FIG. 4. A letter containing a David St. address is scanned by OCR system 40 which reads the name of the street as OAVIO, set forth at 42. The received word OAVIO is then compared, character by character, in turn with each word stored in the EAD 44. The result of this comparison is shown at 46 for the code illustrated in Table II. With respect to each stored word utilized in the comparison, a zero appears where the read character is the same as the character in the corresponding position of the stored word under comparison. In contrast, where the read character is different from the character in the corresponding position of that stored word, a numeral equal to the Hamming distance between the two compared characters appears in 46. The sum of the numerals so generated during each comparison of the received word with the stored word appears at the right in 46. Since the number of characters in "OAVIO" is five, the only acceptable match is one for which the sum of Hamming number is five or less. The only word stored in EAD 44 for which this criterion is met is "DAVID". Hence the read word "OAVIO" is recognized as "DAVID".

Although the invention is described using Hamming distance coding, it will be apparent that Hamming distance is not the only distance property among binary words that can be exploited for recognition of mispelled or misread words. For instance, the difference between code words arranged in a natural order could alternatively be used. In a "natural" order, the code words are listed in order of increasing magnitude, starting with the code word that is all zeros and ending with the code word that is all ones, e.g., 000000, 000001, 000010, 000011, . . . 111111. A different character of the alphabet is then assigned to each code word. The assignments are such that the algebraic difference between the code words for any two characters is inversely dependent on the probability of confusing one of those characters for the other. Thus this difference is smallest for the two characters most likely to be confused and becomes increasingly great for respective pairs of characters whose probabilities of confusion are decreasingly great. By then measuring the difference between the code word representative of a received word and successive code words representative of different stored words a match can be obtained. For example the number 10, or a signal of magnitude 10 volts is represented in the binary system by 001010, and a signal of magnitude 9 volts is represented by 001001. By assigning characters D and O the binary representations 001010 and 001001, respectively, the system will measure only a difference of 1 volt when comparing D to O. When comparing two characters less likely to be interchanged, the system will measure a larger voltage.

In the alternative embodiment of the invention shown in FIG. 3, the probability of confusion of characters is not accounted for in the choice of code word assigned to each character. Instead, the characters are first compared and then a weight is assigned to each comparison according to the probability of confusion. In FIG. 3 the signals developed by OCR system 4 at output terminal 6 are converted by binary encoder unit 8a to binary form. Encoder unit 8*a*, rather than imparting a special distance code, simply assures that each character is given a unique binary representation. Binary encoder 18*a* imparts a like binary representation to each character of that stored word from EAD memory 16 being compared with the read word. The respective binary representations of the read and stored words are supplied to shift registers 12 and 22 respectively. Registers 12 and 22 feed synchronously and sequentially into memory unit 23 the respective binary representations stored in registers 12 and 22. The received character and the stored character are then used to determine from memory unit 23, the score to be given to the comparison. Memory unit 23 stores a character distance matrix. An example of such a matrix, for upper case sans-serif fonts, is shown in the following tabulation. The Character Distance Matrix shown in Table III is similar to the Character Confusability Matrix of Table I, except that the conditional probabilities have been transformed into a convenient form. Since the conditional probabilities for characters must be multiplied to obtain the conditional probability for the word or the address, using the logarithm of the conditional probability converts this operation to a simple addition. The transformation used is the negative logarithm, rounded off to the nearest integer.

The range of the integers used depends on the number of bits that are available to represent the distance. A three-bit representation enables a range of distances of 0 to 7. The base for the logarithm is selected to cover the range of probabilities that are specified. A log base of 3 covers probabilities from 1.0 down to about 0.002. An exception to the above rule for establishing character distances is that the value zero is reserved for the case of the decision being the character that was on the mail. Thus, the "diagonal" terms of the Character Distance Matrix of Table III are all zeros. The received character designates the appropriate row of the matrix and the particular stored character that the received character is being compared to designates the appropriate column of the matrix. Each score is then represented by a three-bit binary sequence at terminal 25. The scores obtained from each match of characters are then added in accumulator 29. A match is obtained, in a manner similar to that discussed previously, by choosing that word stored in the EAD memory which results in the lowest score.

Although this invention has been described with reference to an automatic letter sorting system it will be apparent to those skilled in the art that the invention applied equally as well to any information processing system in which the class of permissible messages is known in advance and can be stored. For example, in the embodiments shown in FIGS. 2 and 3, the OCR system 4 may be replaced by a communications receiver 4a which generates electronic symbols at terminal 6 representative of the received characters.

Although messages related to street addresses have been illustrated, other messages for which the class of permissible messages is known in advance, such as command messages to military personnel, or guidance commands to missile or aircraft systems, can be processed. In addition the received words can contain cipher words made up wholly of letters, or wholly of numerals or of mixtures of numerals and letters.

Although systems employing binary encoders have been described, systems employing encoders employing number systems other than binary also may be used.

I claim:

1. In a method for processing received words in an information processing system, each word (a) comprising a plurality of characters selected from a predetermined group of characters and (b) being a member of a predetermined class of words, said method comprising the steps of:

TABLE III.—CHARACTER DISTANCE MATRIX FOR UPPER CASE SANS SERIF FONTS

| Recognized Characters | Directory Characters | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | A | B | C | D | E | F | G | H | I | J | K | L | M | N | O | P | Q | R | S | T | U | V | W | X | Y | Z |
| 0 | 0 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 3 | 7 | 7 | 7 | 7 | 7 | 7 | 7 | 7 | 7 | 7 | 7 |
| 1 | 5 | 0 | 7 | 7 | 7 | 7 | 7 | 4 | 7 | 7 | 7 | 7 | 7 | 7 | 7 | 7 | 7 | 7 | 3 | 7 | 7 | 7 | 7 | 7 | 7 | 7 | 7 | 7 | 7 | 7 | 7 | 7 | 7 | 7 | 7 | 7 |
| 2 | 7 | 7 | 0 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 3 |
| 3 | 7 | 7 | 7 | 0 | 7 | 7 | 7 | 7 | 5 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| 4 | 7 | 7 | 7 | 7 | 0 | 7 | 7 | 7 | 7 | 4 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| 5 | 7 | 7 | 7 | 7 | 7 | 0 | 5 | 7 | 7 | 4 | 7 | 7 | 7 | 7 | 7 | 7 | 7 | 7 | 7 | 7 | 7 | 7 | 7 | 7 | 7 | 7 | 7 | 7 | 3 | 7 | 7 | 7 | 7 | 7 | 7 | 7 |
| 6 | 7 | 7 | 7 | 7 | 7 | 7 | 0 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| 7 | 7 | 4 | 4 | 7 | 7 | 7 | 7 | 0 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| 8 | 7 | 7 | 7 | 7 | 7 | 7 | 7 | 7 | 0 | 7 | 7 | 3 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| 9 | 7 | 7 | 7 | 7 | 7 | 5 | 7 | 7 | 5 | 0 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| A | 7 | 7 | 7 | 7 | 7 | 7 | 7 | 7 | 7 | 7 | 0 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| B | 7 | 7 | 7 | 7 | 7 | 7 | 7 | 7 | 3 | 7 | 7 | 0 | 7 | 7 | 7 | 7 | 7 | 7 | 7 | 7 | 7 | 7 | 7 | 7 | 7 | 7 | 7 | 6 | 7 | 7 | 7 | 7 | 7 | 7 | 7 | 7 |
| C | 3 | 7 | 7 | 7 | 7 | 7 | 7 | 7 | 7 | 7 | 7 | 7 | 0 | 4 | 4 | 7 | 3 | 7 | 7 | 7 | 7 | 7 | 7 | 7 | 3 | 7 | 3 | 7 | 7 | 7 | 7 | 7 | 7 | 7 | 7 | 7 |
| D | 7 | 7 | 7 | 7 | 7 | 7 | 7 | 7 | 7 | 7 | 7 | 7 | 7 | 0 | 7 | 7 | 7 | 7 | 7 | 7 | 7 | 7 | 7 | 7 | 5 | 7 | 6 | 7 | 7 | 7 | 7 | 7 | 7 | 7 | 7 | 7 |
| E | 7 | 7 | 7 | 7 | 7 | 7 | 7 | 7 | 7 | 7 | 7 | 4 | 7 | 7 | 0 | 7 | 7 | 7 | 7 | 7 | 7 | 7 | 7 | 7 | 7 | 7 | 7 | 7 | 7 | 7 | 7 | 7 | 7 | 7 | 7 | 7 |
| F | 7 | 7 | 7 | 7 | 7 | 7 | 7 | 7 | 7 | 7 | 7 | 5 | 7 | 7 | 3 | 0 | 7 | 7 | 7 | 7 | 7 | 7 | 7 | 7 | 3 | 7 | 5 | 7 | 7 | 7 | 7 | 7 | 7 | 7 | 7 | 7 |
| G | 7 | 7 | 7 | 7 | 7 | 7 | 7 | 7 | 7 | 7 | 7 | 7 | 5 | 7 | 7 | 7 | 0 | 7 | 7 | 7 | 7 | 7 | 7 | 7 | 7 | 7 | 7 | 7 | 7 | 7 | 7 | 7 | 7 | 7 | 7 | 7 |
| H | 7 | 7 | 7 | 7 | 7 | 7 | 7 | 7 | 7 | 7 | 7 | 6 | 7 | 7 | 7 | 7 | 7 | 0 | 7 | 7 | 5 | 7 | 3 | 4 | 7 | 7 | 7 | 5 | 7 | 7 | 7 | 7 | 3 | 7 | 7 | 7 |
| I | 7 | 3 | 7 | 7 | 7 | 7 | 7 | 7 | 7 | 7 | 7 | 7 | 7 | 7 | 7 | 7 | 7 | 6 | 0 | 7 | 7 | 6 | 7 | 7 | 7 | 7 | 7 | 7 | 7 | 4 | 7 | 7 | 7 | 7 | 7 | 7 |
| J | 5 | 7 | 7 | 7 | 7 | 7 | 7 | 7 | 7 | 7 | 7 | 7 | 7 | 7 | 7 | 7 | 7 | 7 | 7 | 0 | 7 | 7 | 7 | 7 | 5 | 7 | 5 | 7 | 7 | 7 | 6 | 7 | 7 | 7 | 7 | 7 |
| K | 7 | 7 | 7 | 7 | 7 | 7 | 7 | 7 | 7 | 7 | 7 | 7 | 7 | 7 | 7 | 7 | 7 | 6 | 7 | 7 | 0 | 7 | 4 | 7 | 7 | 7 | 7 | 3 | 7 | 7 | 7 | 7 | 4 | 7 | 7 | 7 |
| L | 5 | 7 | 7 | 7 | 7 | 7 | 7 | 7 | 7 | 7 | 7 | 7 | 4 | 7 | 5 | 7 | 7 | 7 | 5 | 7 | 7 | 0 | 7 | 7 | 4 | 7 | 5 | 7 | 7 | 7 | 3 | 7 | 7 | 7 | 7 | 7 |
| M | 7 | 7 | 7 | 7 | 7 | 7 | 7 | 7 | 7 | 7 | 7 | 7 | 7 | 7 | 7 | 7 | 7 | 5 | 7 | 7 | 7 | 7 | 0 | 4 | 7 | 7 | 7 | 7 | 7 | 7 | 7 | 7 | 5 | 7 | 7 | 7 |
| N | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 6 | 0 | 7 | 7 | 7 | 7 | 7 | 7 | 7 | 7 | 5 | 7 | 7 | 7 |
| O | 3 | 7 | 7 | 7 | 7 | 7 | 7 | 7 | 7 | 7 | 7 | 6 | 5 | 3 | 7 | 7 | 7 | 7 | 7 | 7 | 7 | 7 | 7 | 7 | 0 | 7 | 3 | 7 | 7 | 7 | 7 | 7 | 7 | 7 | 7 | 7 |
| P | 7 | 7 | 7 | 7 | 7 | 7 | 7 | 7 | 7 | 7 | 7 | 6 | 7 | 7 | 7 | 3 | 7 | 7 | 7 | 7 | 7 | 7 | 7 | 7 | 7 | 0 | 7 | 5 | 7 | 7 | 7 | 7 | 7 | 7 | 7 | 7 |
| Q | 7 | 7 | 7 | 7 | 7 | 7 | 7 | 7 | 7 | 7 | 7 | 7 | 6 | 5 | 7 | 7 | 7 | 7 | 7 | 7 | 7 | 7 | 7 | 7 | 6 | 7 | 0 | 7 | 7 | 7 | 7 | 7 | 7 | 7 | 7 | 7 |
| R | 7 | 7 | 7 | 7 | 7 | 7 | 7 | 7 | 7 | 7 | 7 | 4 | 7 | 7 | 7 | 7 | 7 | 7 | 7 | 7 | 7 | 7 | 7 | 7 | 7 | 7 | 7 | 0 | 7 | 7 | 7 | 7 | 7 | 7 | 7 | 7 |
| S | 7 | 7 | 7 | 7 | 7 | 3 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 0 | 7 | 7 | 7 | 7 | 7 | 7 | 7 |
| T | 7 | 7 | 7 | 7 | 7 | 7 | 7 | 7 | 7 | 7 | 7 | 7 | 7 | 7 | 7 | 7 | 7 | 7 | 4 | 7 | 7 | 7 | 7 | 7 | 7 | 7 | 7 | 7 | 7 | 0 | 7 | 7 | 7 | 7 | 5 | 7 |
| U | 4 | 7 | 7 | 7 | 7 | 7 | 7 | 7 | 7 | 7 | 5 | 7 | 3 | 7 | 7 | 7 | 7 | 7 | 7 | 7 | 7 | 5 | 7 | 7 | 3 | 7 | 3 | 7 | 7 | 7 | 0 | 7 | 7 | 7 | 7 | 7 |
| V | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 0 | 7 | 7 | 7 | 7 |
| W | 7 | 7 | 7 | 7 | 7 | 7 | 7 | 7 | 7 | 7 | 7 | 7 | 7 | 7 | 7 | 7 | 7 | 5 | 7 | 7 | 7 | 7 | 6 | 7 | 7 | 7 | 7 | 7 | 7 | 7 | 7 | 7 | 0 | 7 | 7 | 7 |
| X | 7 | 7 | 7 | 7 | 7 | 7 | 7 | 7 | 7 | 7 | 7 | 7 | 7 | 7 | 7 | 7 | 7 | 7 | 7 | 7 | 6 | 7 | 7 | 7 | 7 | 7 | 7 | 7 | 7 | 7 | 7 | 7 | 7 | 0 | 7 | 7 |
| Y | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 5 | 7 | 6 | 7 | 7 | 0 | 7 |
| Z | 7 | 7 | 3 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 0 |
| — | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 2 | 2 | 2 | 3 | 3 | 3 | 3 | 4 | 3 | 3 | 3 | 3 |
| % | 1 | 7 | 7 | 7 | 7 | 7 | 7 | 7 | 7 | 7 | 7 | 7 | 7 | 1 | 7 | 7 | 7 | 7 | 7 | 7 | 7 | 7 | 7 | 7 | 2 | 7 | 7 | 7 | 7 | 7 | 7 | 7 | 7 | 7 | 7 | 7 |
| ( | 3 | 7 | 7 | 7 | 7 | 7 | 7 | 7 | 7 | 7 | 7 | 7 | 5 | 7 | 7 | 7 | 7 | 7 | 7 | 7 | 7 | 7 | 7 | 7 | 1 | 7 | 2 | 7 | 7 | 7 | 7 | 7 | 7 | 7 | 7 | 7 |

storing in said processing system signals representative of each word of said predetermined class of words, converting by means in said processing system each character of a received word to a unique binary sequence representative of each of said characters, converting by means in said processing system each character of a stored word to said unique binary sequence, comparing by means in said processing system said binary sequence representative of said received word to said binary sequence representative of the corresponding positioned character in said stored word, the improvement comprising:

storing in said processing system a binary representation code of said predetermined characters, said code having a different representation of each of said characters and having a Hamming distance between code representations of different characters inversely related to the probability of confusion between characters, employing said binary representation code as said unique binary sequence, computing in said processing system the Hamming distance between said received word and said stored word, and accepting said stored word as a match for said received word when the Hamming distance between said stored word and said received word is less than the number of characters in said received word.

2. In an information processing system for recognizing received words, each word (a) comprising a plurality of characters selected from a predetermined group of characters and (b) being a member of a predetermined group of words, said system comprising:

first means for generating an input signal representative of each character of a received word, second means for converting said input signal to a binary sequence, each character of said predetermined group of characters having a unique binary representation, third means for storing each word of said predetermined group of words, fourth means for converting each character of a word stored in said third means to said unique binary representation, and fifth means for comparing in binary form each character of said received word with the correspondingly positioned character in said word stored in said third means, the improvement comprising:

sixth means for storing information on the probability of confusion between said characters of said predetermined group, seventh means for generating a signal having a magnitude related to the combined probabilities of confusion of the characters in said received word with those of said stored word, and eighth means for comparing the magnitude of said signal generated by said seventh means with a predetermined value to determine whether a match exists between said received word and said stored word.

3. The system of claim 2 wherein said first means comprises an optical character recognition system.

4. The system of claim 2 wherein said first means comprises a communications receiving system.

5. The system of claim 2 wherein said means for storing information comprises memory means containing said unique binary representations of said predetermined group of characters, and said binary representations being such that the Hamming distance between respective representations of pairs of characters in said predetermined group of characters is inversely related to the probability of confusion of said characters.

6. The system of claim 5 wherein said seventh means comprises an exclusive-or circuit and said predetermined value is equal to the sum of the characters in said received word.

7. The system of claim 2 wherein said sixth means for storing information comprises a matrix having an associated memory that contains character distance information.

8. The system of claim 7 wherein character difference information is in the form of a negative logarithm of the probability of confusion between characters.

9. The system of claim 8 wherein said seventh means comprises an accumulator for combining negative logarithm differences between the binary representations of characters compared by said fifth means to obtain said signal, and said predetermined value is equal to the sum of the characters in said received word.

10. In an information processing system for recognizing received words falling within a predetermined class of words each comprising a plurality of characters, said system comprising:

first means for generating an input signal representative of each character of a received word, second means for converting said input signal into an input binary sequence, each of said characters having a unique binary representation, third means for storing said words of said predetermined class, each character of each of said stored words having a stored binary sequence employing said unique binary representation, and fourth means for comparing each of said input binary sequences to the stored binary sequence representative of the correspondingly positioned character in each one of said stored words, and for carrying out this comparison for a succession of said stored words, the improvement comprising:

means included in said second means for storing a binary representation code of said characters, said code having a different representation for each one of said characters and the Hamming distance between a code representation of a first character and a code representation of a second character being inversely dependent on the probability of confusion between said first and second characters, fifth means for computing the Hamming distance between received words and stored words, said fifth means comprising an exclusive-or gate having first and second input terminals and an output terminal, a digital adder having an input terminal and an output terminal, means for supplying said input binary sequences to said first input terminal of said exclusive-or gate, means for supplying said stored binary sequences to said second input terminal of said exclusive-or gate, means for connecting said output terminal of said exclusive-or gate to said input terminal of said adder, and sixth means for producing a given response when said computed Hamming distance is below an arbitrary value, said sixth means comprising means for producing in response to said one of said stored words supplied by said third means a count signal indicative of the number of characters in said supplied word, and a difference circuit responsive to both said count signal and the output signal of said adder to produce a signal indicative of the difference between the number represented by said count signal and the number represented by said output signal.

11. The system of claim 10 wherein said first means comprises an optical character recognition system.

12. In an information processing system for recognizing received words, each word (a) comprising a plurality of characters selected from a predetermined group of characters and (b) being a member of a predetermined class of words, said system comprising:

first means for generating an input signal representative of each character of a received word, second means for storing said words constituting said predetermined class, third means for converting said input signal to a binary sequence, each character of said predetermined group of characters having a unique binary representation, fourth means for converting each of said stored words to a binary sequence, each character of said stored words having said unique binary representation, and fifth means for comparing each character of said received word to the correspondingly positioned character in each one of said stored words supplied by said second means, and for carrying out this comparison for a succession of said stored words, the improvement wherein said comparison means comprises:

sixth means for generating, in response to said input signal representative of said character of said received word and to another signal representative of said correspondingly positioned character of said one of said stored words, a weighting factor signal representative of the probability that said input signal is representative of said correspondingly positioned character, said sixth means comprising means for storing a binary representation code of said predetermined characters, said code having a different representation for each of said characters, and the Hamming distance between a code representation of a first character and a code representation of a second character being inversely dependent on the probability of confusion between said first and second characters, said sixth means additionally comprising an exclusive-or gate having first and second input terminals and an output terminal, means for supplying the output of said third means to said first input terminal, and means for supplying the output of said fourth means to said second input terminal, seventh means for producing in response to said weighting factor signals an output signal indicative of the sum of said weighting factor signals for all characters of said one of said stored words, said seventh means comprising an adder having an input terminal and an output terminal, and means connecting said output terminal of said exclusive-or gate to said input terminal of said adder, and eighth means responsive to said output signal to indicate whether said sum of said weighting factor signals exceeds a given value, said eighth means comprising means for producing in response to said one of said stored words supplied by said second means a count signal indicative of the number of characters in said supplied word, and a difference circuit responsive to both said count signal and the output signal of said adder to produce a signal indicative of the difference between the number represented by said count signal and the number represented by said output signal.

* * * * *